(12) United States Patent
Jin et al.

(10) Patent No.: US 6,697,423 B1
(45) Date of Patent: Feb. 24, 2004

(54) PRECURSOR DECISION FEEDBACK EQUALIZER (PDFE)

(75) Inventors: Gary Q. Jin, Kanata (CA); Gordon J. Reesor, Russell (CA)

(73) Assignee: Zarlink Semiconductor Inc. (CA)

( * ) Notice: Subject to any disclaimer, the term of this patent is extended or adjusted under 35 U.S.C. 154(b) by 634 days.

(21) Appl. No.: 09/685,489

(22) Filed: Oct. 10, 2000

(30) Foreign Application Priority Data

Oct. 18, 1999 (GB) ................................. 9924624

(51) Int. Cl.$^7$ .................................................. H03H 7/30
(52) U.S. Cl. ...................................................... 375/233
(58) Field of Search ................................ 375/229, 230, 375/231, 232, 233, 240.05, 240.02, 240.07, 240.29; 370/290, 291, 465; 708/323

(56) References Cited

U.S. PATENT DOCUMENTS

| | | | | |
|---|---|---|---|---|
| 5,777,692 A | * | 7/1998 | Ghosh | 348/725 |
| 6,002,713 A | * | 12/1999 | Goldstein et al. | 375/222 |
| 6,314,135 B1 | * | 11/2001 | Schneider et al. | 375/232 |

FOREIGN PATENT DOCUMENTS

WO           9819432    *  5/1998

* cited by examiner

*Primary Examiner*—Emmanuel Bayard
(74) *Attorney, Agent, or Firm*—Jones Day

(57) ABSTRACT

A decision feedback equalizer is provided which is capable of canceling precursor Inter-Symbol Interference (ISI) even when knowledge of future data is unavailable. A novel DFE algorithm is utilized whereby the detection signal-to-noise ratio (SNR) is increased in two aspects: the precursor contribution is eliminated and the sampling location (relative to the channel response) is positioned at the maximum SNR location. As a result, the loop length for data transmission in a cable can be extended.

6 Claims, 6 Drawing Sheets

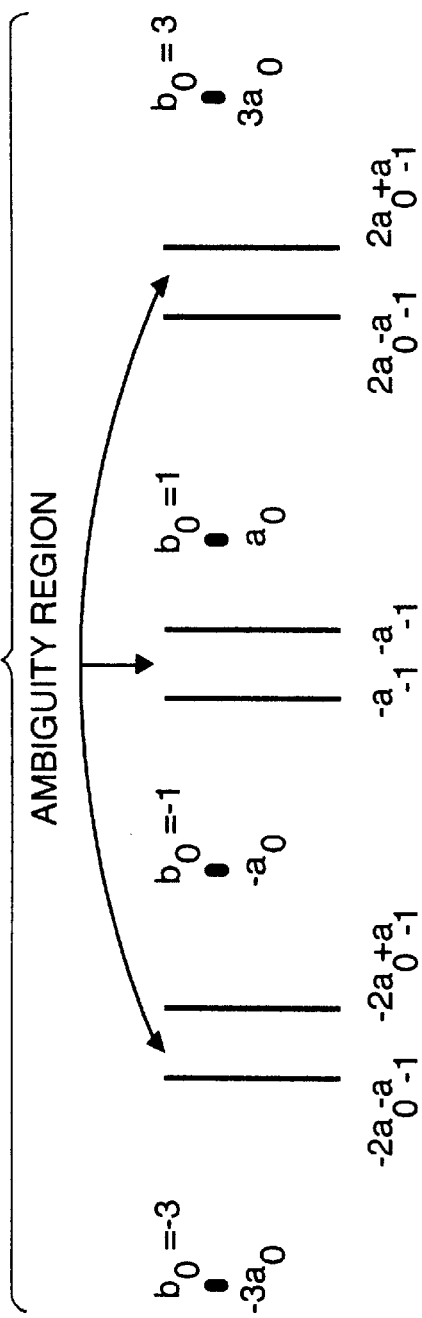
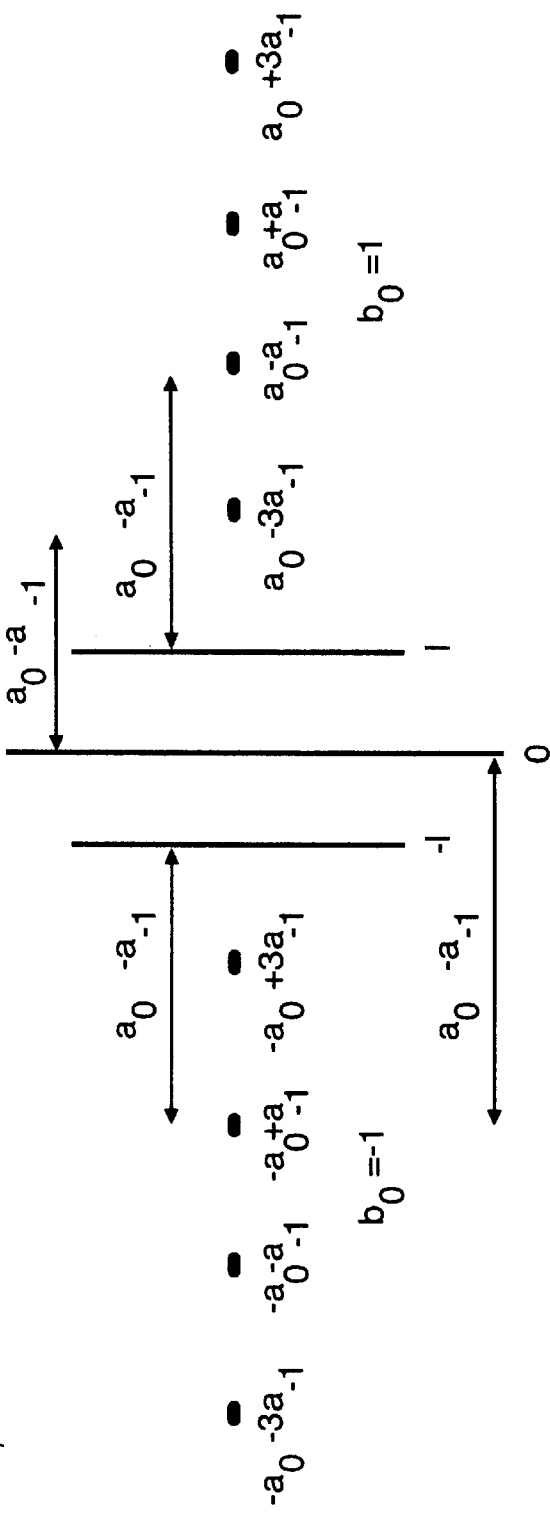

PRECURSOR DECISION FEEDBACK EQUALIZER (PDFE)

FIELD OF THE INVENTION

The present invention relates in general to data communication systems and more particularly to a precursor decision feedback equalizer (DFE) capable of canceling precursor Inter-Symbol Interference (ISI) even when future data is not available.

BACKGROUND OF THE INVENTION

In data transmission along Unshielded Twisted Pair (UTP), the transmission channel is never perfect. Rather, the channel pulse response is characterized by a rising edge and a long tail. As a result, samples received over the UTP transmission channel are known to contain interference from all of the data transmitted. Such interference is called Inter-Symbol Interference (ISI). Decision Feedback Equalizers (DFEs) are known in the art for combating ISI. These DFEs are incorporated into prior art digital data receivers.

The purpose of a DFE is firstly to estimate the contributions of non-current data relative to the current received data, and then to subtract these contributions to cancel the ISI. After the ISI has been canceled, the current data can be detected with a simple threshold detector. A most commonly used algorithm for the DFE is the (Least Mean Square) LMS adaptive algorithm, such as described in "C261(UNIC) DSP Re-engineering and Performance Report" Mitel Semiconductor, Document No. C261AP13, Oct. 21, 1996). During a so-called training period of the DFE, all of the data is known, and the contributions to the ISI can be estimated with an adaptive algorithm. Then, during normal transmission, post-estimated data can be used in the adaptive DFE to cancel the postcursor ISI (i.e. ISI caused by data already received). However, since "future" data is not available, it is difficult to eliminate precursor ISI (i.e. ISI caused by future bauds in the channel which have not yet been received by the receiver). As a result, the data detection performance is deteriorated in prior art DFEs due to the existence of the precursor ISI.

SUMMARY OF THE INVENTION

According to the present invention, a new DFE structure is provided which cancels the first precursor ISI. In almost all applications, the primary contribution to precursor ISI comes from the next nearest baud. In other words, only one precursor symbol is significant. Therefore, data detection performance can be dramatically improved by the elimination of only the first precursor ISI.

In prior art DFE algorithms, the sampling location is established such that the first precursor is small enough to be ignored. As a result, the main tap sampling location is normally located at the rising edge of the channel, which may not be at the peak location of the channel, and therefore the received SNR (i.e. the signal-to-noise ratio between the main tap weight and the noise level) suffers a loss. By allowing for the existence of the first precursor and ISI cancellation based thereon, the main tap weight for the current data can be moved further toward the peak location of the channel response in the DFE implementation of the present invention, such that the SNR is maximized. Consequently, the maximum loop length can be reached for transmission over unshielded twisted pair cable. This is useful for Basic Rate ISDN (2B1Q) transceivers as well as higher speed transceivers such as HDSL.

BRIEF DESCRIPTION OF THE DRAWINGS

A detailed description of the prior art and of a preferred embodiment of the invention is provided herein below with reference to the following drawings, in which:

FIG. 5 is a generic representation of decision boundaries and ambiguity regions at $t=t_0$ for the first embodiment;

FIG. 6 shows an extended decision distance for detecting a first data baud at a first time $t=t_0$ in accordance with the DFE algorithm according to a second embodiment of the invention;

DETAILED DESCRIPTION OF PRIOR ART AND PREFERRED EMBODIMENT

As a result of the channel effect discussed above, a received sample, s(n) in a digital data receiver, contains interference which is a linear combination of all of the data transmitted. Thus, let Equation (1) be:

$$s(n) = a_0 b_0 + \sum_{k \neq 0} a_k b_k + v(n)$$

where $a_k$ represents a sample of the total channel response $a(t)$ including the contributions from the transmitter, the receiver, and the transmission line, and v(n) represents noise which is uncorrelated with the data $b_k$ (i.e. $b_k$ is the information data in 2B1Q format $b_k=\pm1,\pm3$).

The noise v(n) includes all of the contributions from thermal noise in the circuit, the near-end cross talk (NEXT) and the near-end echo.

The first term of Equation (1) (i.e. $a_0 b_0$) is the desired signal term, wherein signal power is represented by $a_0$ and $b_0$ is the current data in 2B1Q format ($b_0 \pm 1, \pm 3$). For the best receive performance (i.e. high SNR), it is required that $a_0$ be as large as possible. Because $a_0$ is sampled from the total channel response $a(t)$ in order for a timing algorithm to be effective $a_0$ should be located at the peak position of $a(t)$. However, when $a_0$ is located at the peak of $a(t)$, other assumptions for the prior art DFE are violated. One of these assumptions is that the precursor of $a_k$ (k<0) may not be small enough to be ignored. In prior art DFE algorithms, it is well known to use the post-received data to cancel the ISI contributed by the post cursor. However, there is no way to predict the future data in order to cancel the precursor ISI.

Figure 1:
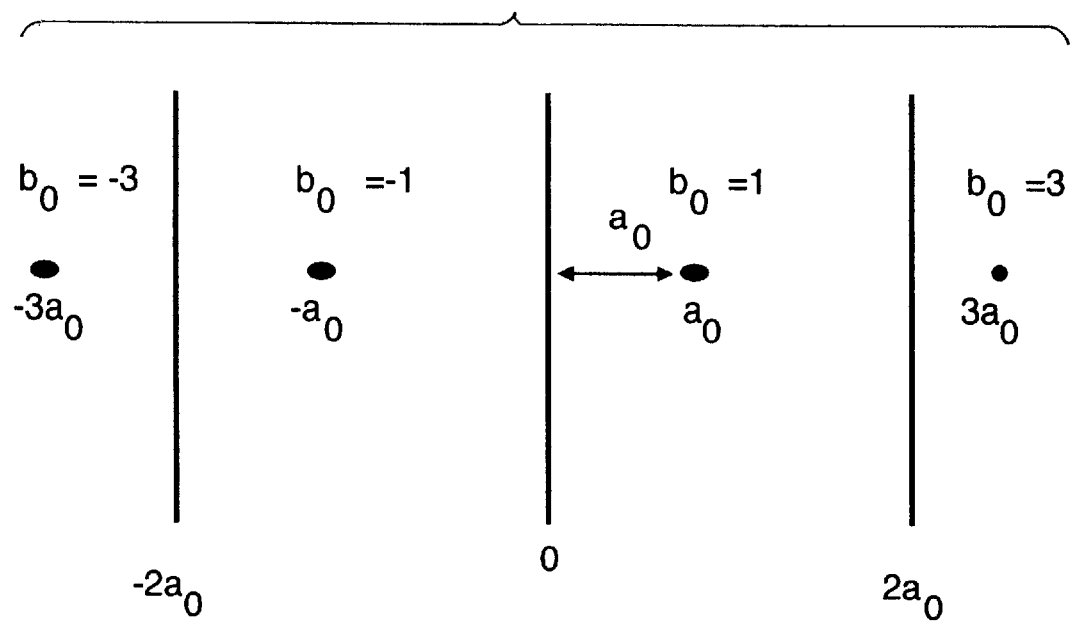
FIG. 1 shows the optimum decision region for a 2B1Q signal as is known from the prior art.

For a 2B1Q signal, the received data has four possible levels: $\pm a_0$ and $\pm 3a_0$. The optimum decision region is shown in FIG. 1. The maximum noise amplitude for non-error detection is $v(n)<a_0$. This is based on the assumption that all postcursor ISI has been canceled and the precursor $a_{-1}$ is 0. When all postcursor ISI has been canceled, the signal becomes:

$$s_0(n) = s(n) - \sum_{k>0} a_k b_k$$

Figure 2:
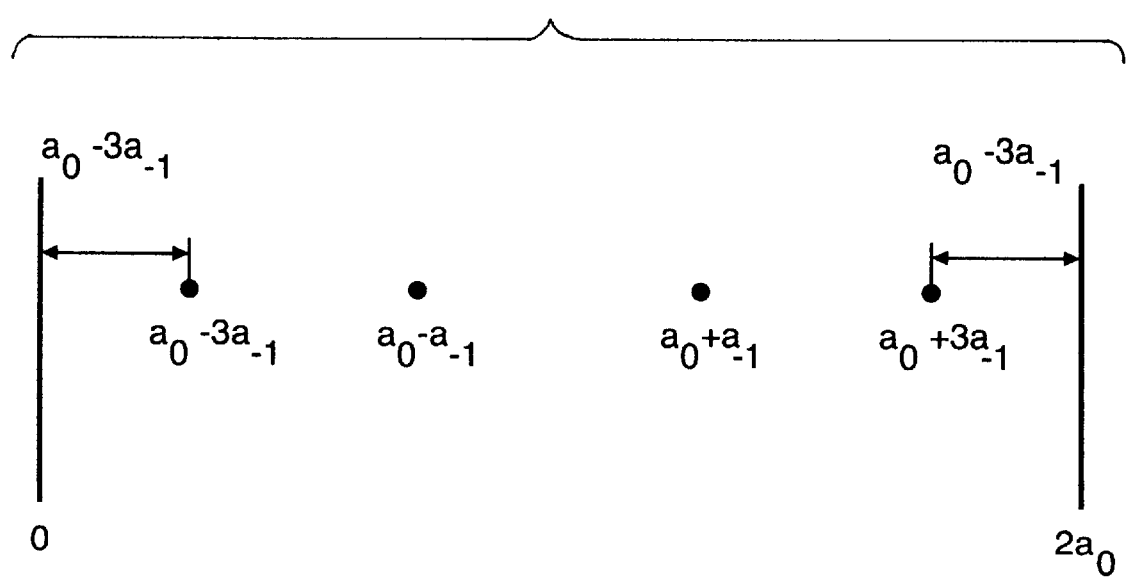
FIG. 2 shows decision distance for a 2B1Q signal with one precursor.

When $a_{-1} \neq 0$, and assuming other precursor terms than the first one are small enough to be ignored, the signal after postcursor ISI cancellation is $s_0(n)=a_0 b_0+a_{-1}b_{-1}+v(n)$. Taking $b_0=1$ as an example, because $b_{-1}$ may be one of the four values: $\pm 1$, $\pm 3$, there are four possible locations (not just one) for the signal $s_0(n)$, as shown in FIG. 2. The minimum distance between all of these signal locations and the decision boundary (0 and $2a_0$ in the example of FIG. 2) is referred to herein as the decision distance. In the example of FIG. 2, the decision distance is $a_0-3a_{-1}$, which means that the maximum tolerable noise amplitude $v(n)$ for non-error detection is $a_0-3a_{-1}$, which is smaller than $a_0$ as shown in FIG. 1. The best sampling location for $a_0$ is where $|a(t)| -3|a(t-T)|$ is maximized, (but not $|a(t)|$). It will be understood that, because of the existence of the precursor $a_{-1}$, the maximum tolerable noise amplitude is reduced from $|a_0|$ to $|a_0|-3|a_{-1}|$.

According to the present invention, two DFE algorithms are set forth, each of which increases the decision distance when precursor data is present.

FIRST EMBODIMENT

Figure 3:
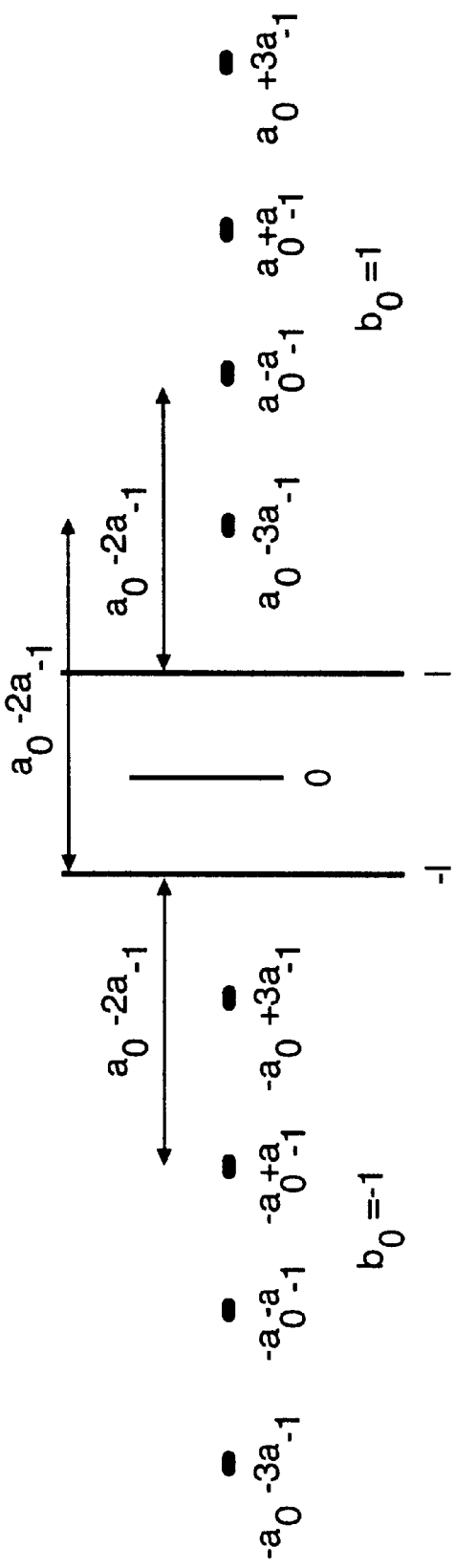
FIG. 3 shows an extended decision distance for detecting a first data baud at a first time $t=t_0$ in accordance with the DFE algorithm according to a first embodiment of the invention.

In prior art DFEs, the known data $b_k$ (k>0) is used to cancel the ISI contribution in Equation (1). Because the future baud $b_{-1}$ is unknown to the receiver after the training period, the precursor ISI cannot be canceled even if $a_{-1}$ is known through the training period. However, it has been recognized that the decision distance can be increased by extending the decision boundary. As an example, for the decision boundary between $b_0=1$ and $b_0=-1$, if the decision boundary is extended from 0 to −1 for $b_0=1$ and from 0 to 1 for $b_0=-1$ (see FIG. 3), then the decision distance is increased to $a_0-3a_{-1}+1$.

Now, $b_0=1$ and $b_0=-1$ share the same region from −1 to 1. This region is referred to herein as the decision ambiguity region. When a signal falls within the decision ambiguity region, a secondary decision is required by the DFE algorithm. Under the assumption $$a_0-3a_{-1}>0 \text{ where } (a_0>0, a_{-1}>0) \quad (2)$$

the value 1 is chosen as $l=a_{-1}$ such that −1 is the middle point between $-a_0+a_{-1}$ and $a_0-3a_{-1}$. Letting $$s_1(n) = s(n) - \sum_{k>1} a_k b_k$$

the baud decision according to the method of the present invention is as follows:

1. at $t=t_0$, if after a normal DFE operation to cancel the postcursor ISI, the distance between the received signal $s_0(n)$ and the decision boundary in FIG. 1 (the boundary is 0 in the above example) is larger than 1 ($l=a_{-1}$), a correct decision can be made for baud $b_0$ under the assumption $|v(n)|<a_0-2a_{-1}$. Ambiguity occurs if the distance between the received signal and the decision boundary (0 in the above example) is smaller than 1, (i.e. if the signal falls inside the region [−1,1] shown in FIG. 3). Under the assumption that $|v(n)|<a_0-2a_{-1}$, there are two possible solutions for $b_0$, each corresponding to a special $b_{-1}$ value. They are $b_0=-1, b_{-1}=3$, and $b_0=1, b_0=-3$, which represent the solutions closest to the decision boundary. When ambiguity occurs, these two possibilities are retained and the baud decision is deferred to time $t_0+T$ at which time the next baud arrives.

Figure 4:
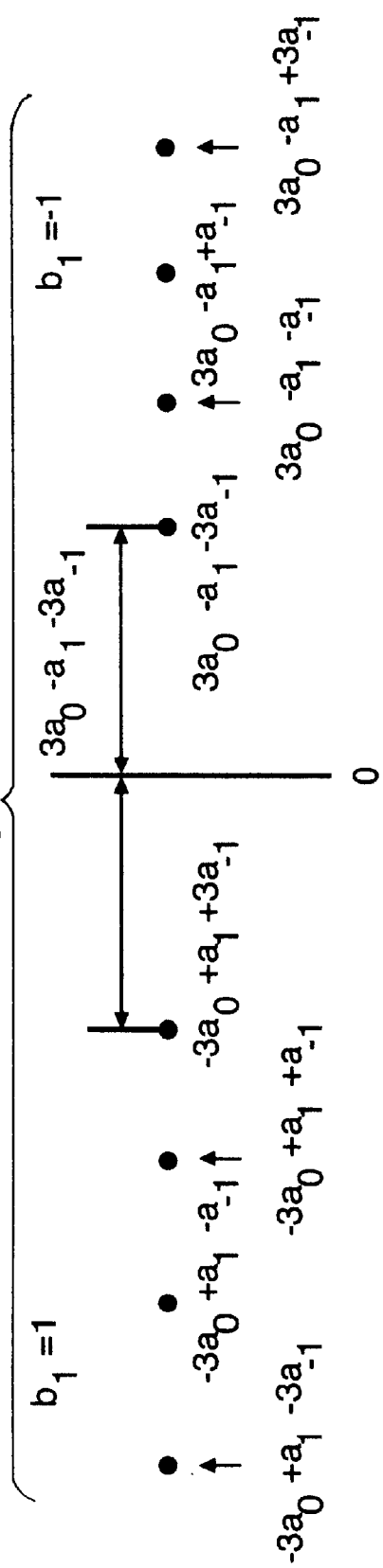
FIG. 4 shows the extended decision distance for detecting a subsequent data baud at time $t_1=t_0+T$ according to the first embodiment.

2. at $t=t_0+T$, $b_1$ is $b_0$ from time $t_0$, and $b_0$ is $b_{-1}$ from time $t_0$. If no ambiguity has occurred at $t=t_0$, the algorithm returns to step 1. Otherwise, the ISI contributions are calculated from all known data $b_k$ (k>1) and then eliminated from the input signal by subtraction. Then, continuing with the same example wherein the signal falls inside the region [−1,1] at $t=t_0$, then at time $t=t_0+T$, $b_1$ and $b_0$ can assume only one of two possible pairs of values: $b_{-1}=-1$, $b_0=3$ and $b_1=1$, $b_0=-3$. With the next arriving baud $b_{-1}$ there are eight possible locations for the data $s_1(n)=(a_1 b_1+a_0 b_0+a_{-1}b_{-1})$ as shown in FIG. 4.

The decision boundary is therefore set at the middle of $-3a_0+a_1+3a_{-1}$ and $3a_0 a_1-3a_{-1}$, which is 0. If the signal lies at the left side of the boundary, $b_1=1$. Otherwise, $b_1=-1$. From FIG. 4, the secondary decision distance is $3a_0 a_1-3a_{-1}$. If $$3a_0-a_1-3a_{-1}>a_0-2a_{-1}$$

$$\text{or } 2a_0>a_1+a_{-1} \quad (3)$$

then the DFE produces a correct decision for $b_{-1}$ if $|v(n)|<a-2a_{-1}$, i.e.

$$b_1 = \begin{cases} 1, & s_1(n) < 0 \\ -1, & s_1(n) > 0 \end{cases}$$

After $b_1$ is determined, the algorithm returns to step 1) for the detection of $b_0$. In the above derivations, it is assumed that $a_0$, $a_{-1}$ and $a_1$ are all positive numbers. Otherwise, their absolute values should be used instead.

In general, all decision boundaries and the ambiguity regions at $t=t_0$ are as shown in FIG. 5. When ambiguity occurs between $b_0=k$ and $b_0=k+2$ (k=−3,−1, or 1), the decision boundary for the secondary decision is (k+1) $a_1$. In other words, at $t=t_0+T$, $b_1$ (which is the undecided $b_0$ at time $t_0$) is determine by $$b_1 = \begin{cases} k+2, & s_1(n) < (k+1)a_1 \\ k, & s_1(n) > (k+1)a_1 \end{cases}$$

In the above described embodiment of DFE, the decision distance is increased from $|a_0|-3|a_{-1}|$ to $|a_0|-2|a_{-1}|$, and the constraints for channels are given by Equations (2) and (3).

SECOND EMBODIMENT

Returning to FIG. 3, if the value of 1 can be further increased the decision distance or the detecting SNR can also be increased further. Again, using the boundary between $b_0=1$ and $b_0=-1$ as an example, set $l=2a_{-1}$ such that l lies in the middle of $a_0+a_{-1}$ and $-a_0+3a_{-1}$, and −1 lies in the middle of $a_0-3a_{-1}$, and $-a_0-a_{-1}$ (see FIG. 6). The corresponding detection procedures are as follows:

1. At time $t=t_0$, if after the normal DFE algorithm to cancel postcursor ISI, the received signal $s_0(n)$ is outside of the ambiguity region, there is a correct baud decision for $b_0$. When the signal falls in the ambiguity region, e.g. in the region [−1,1] (l=2a$_{-1}$), decision ambiguity occurs. According to this embodiment, the ambiguity region is divided into two parts. If the signal is in the region [0,1], there are three possible values for b$_0$ and b$_{-1}$ as long as the noise is bounded as $|v(n)|<|a_0|-|a_{-1}|$. These locations are {b$_0$=−1,b$_{-1}$=3}, {b$_0$=1, b$_{-1}$=−3} and {b$_0$=1, b$_{-1}$=−1}. If the signal is in the region [−1,0], three possible values for b$_0$ and b$_{-1}$ are {b$_0$=−1, b$_{-1}$32 1}, {b$_0$=−1, b$_{-1}$=3} and {b$_0$=1, b$_{-1}$=−3}. When ambiguity occurs, the current baud decision is deferred until the arrival of the next baud.

Figure 7:
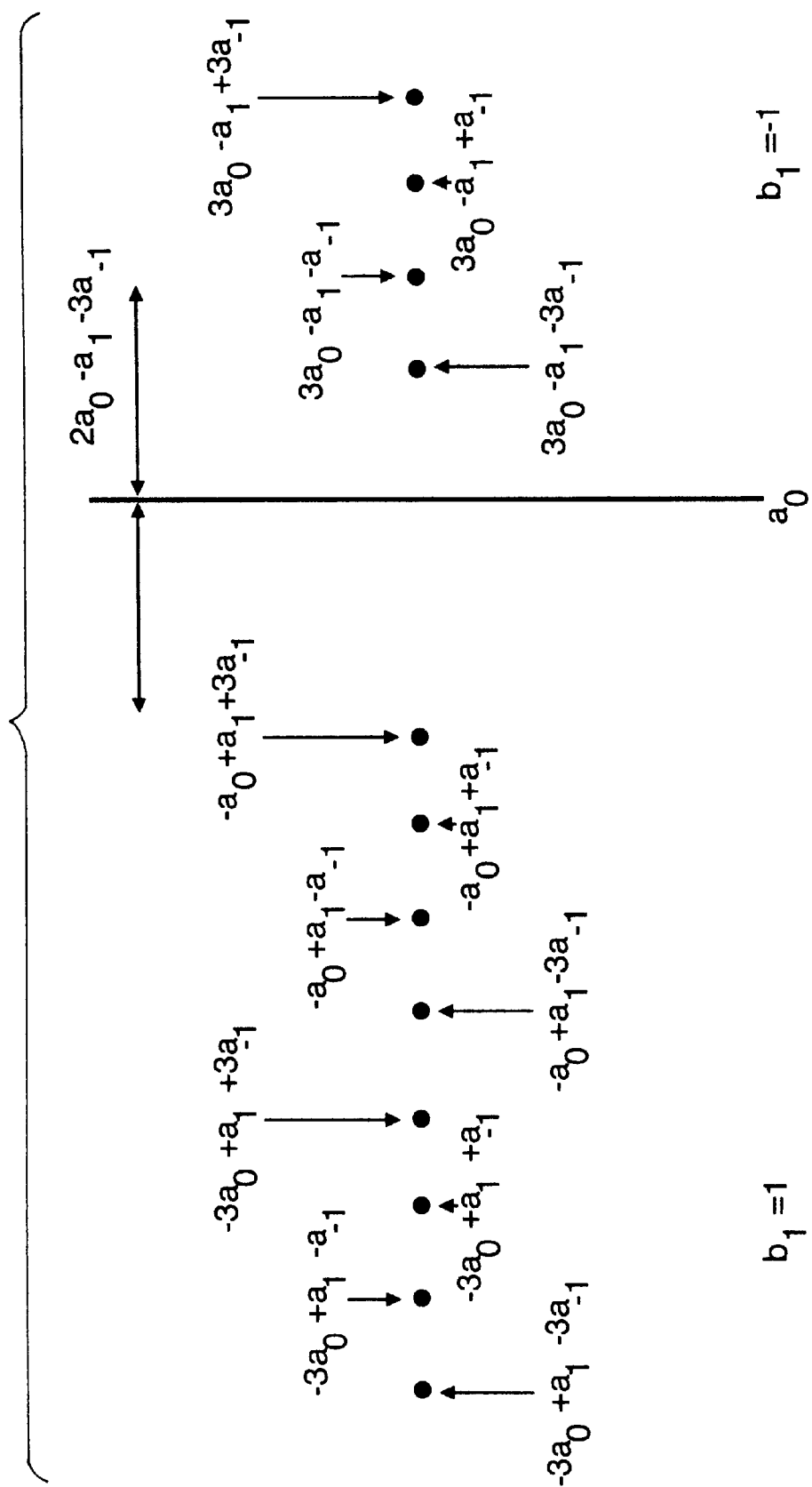
FIG. 7 shows the extended decision distance for detecting a subsequent data baud at time $t_1=t_0+T$ according to the second embodiment.

2. at t=t$_0$+T, if no ambiguity occurs at t=t$_0$, the algorithm repeats step 1. Otherwise, the baud decision is made first for b$_1$. As an example, if it is assumed that the signal was in the ambiguity region [0, 2a$_{-1}$] at t=t$_0$. At time t=t$_0$+T, there are three possible values for b$_0$ and b$_1$, which are {b$_1$=−1, b$_0$=3}, {b$_1$=1, b$_0$=−3} and {b$_1$=1, b$_0$=−1}. With the next arriving baud b$_{-1}$, also having four possible values, there are a total of twelve possible locations for s$_1$(n)=a$_1$b$_1$+a$_0$b$_0$+a$_{-1}$b$_{-1}$, as shown in FIG. 7. To determine the value for b$_1$, the decision boundary is set at a$_0$ which is at the middle of −a$_0$+a$_1$+3a$_{-1}$ and 3a$_0$−a$_1$−3a$_{-1}$. The decision distance, by FIG. 7, is 2$|a_0|-|a_1|-3a_{-1}|$. If $$2|a_0|-|a_1|-3|a_{-1}|>|a_0|-|a_{-1}|$$

$$\text{or } |a_0|>|a_1|+2|a_{-1}| \quad (4)$$

a correct decision can be made for b$_1$ if $|v(n)|<a_0-a_{-1}$, i.e.

$$b_1 = \begin{cases} 1, & s_1(n) < |a_0| \\ -1, & s_1(n) > |a_0| \end{cases}$$

the algorithm returns to step 1) for the detection of b$_0$.

Figure 8:
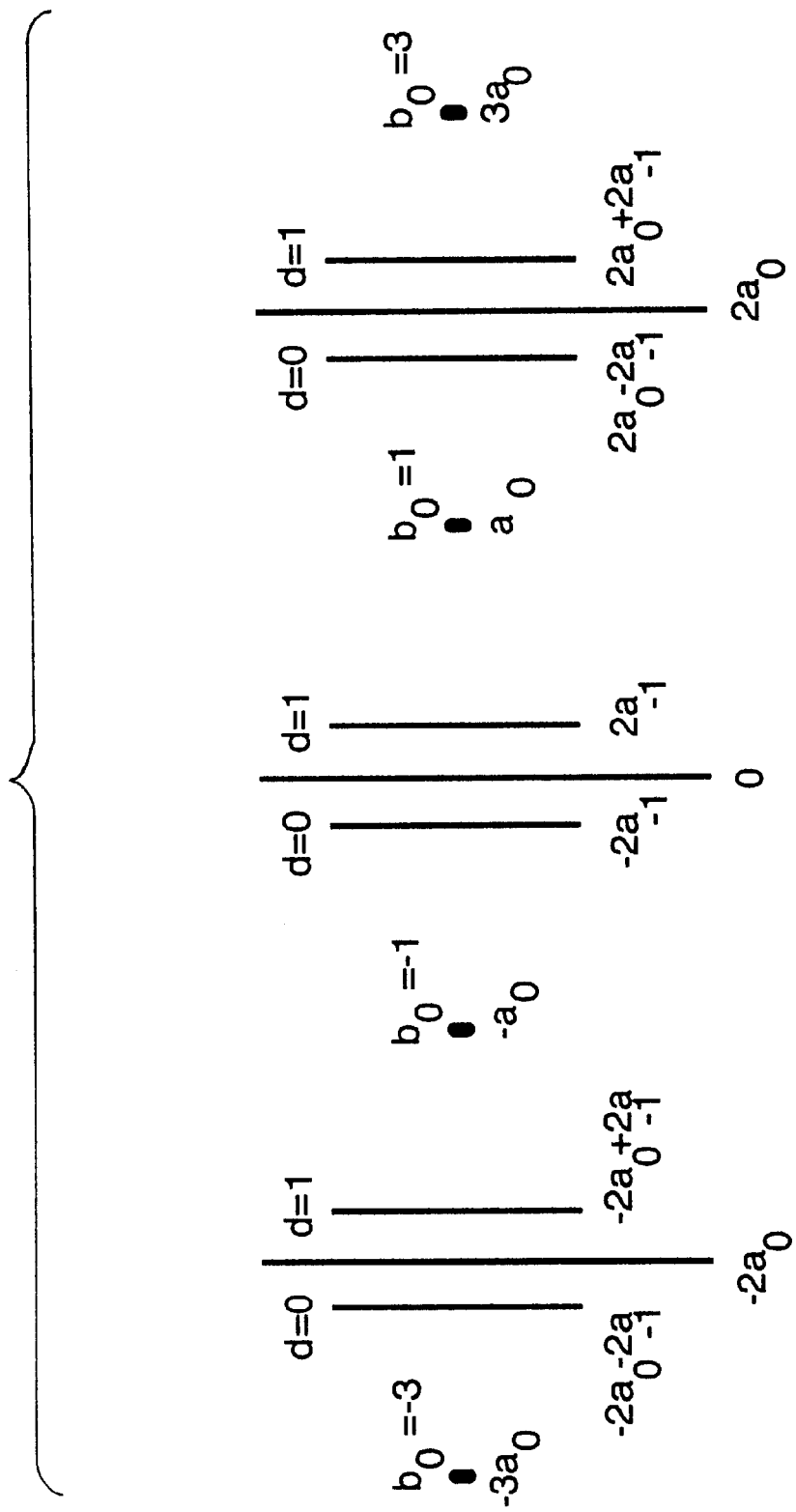
FIG. 8 is a generic representation of decision boundaries and ambiguity regions at $t=t_0$ for the second embodiment.

For general cases, the decision region is the same as shown in FIG. 5, except that now each ambiguity region is divided into two parts, represented respectively by d=0 and d=1 in FIG. 8. At t=t$_0$, if ambiguity occurs between b$_0$=k and b$_0$=k+2 (k=−3,−1 or 1), with a value d(d =0 or 1), the boundary for the secondary decision (at t=t$_0$+T) will be (k+1)a$_1$+(2d−1)a$_0$, i.e.

$$b_1 = \begin{cases} k+2, & s_1(n) < (k+1)a_1 + (2d-1)a_0 \\ k, & s_1(n) > (k+1)a_1 + (2d-1)a_0 \end{cases}$$

Now, the decision distance is further increased to $|a_0|-|a_{-1}|$, and the required constraints are given by Equations (2) and (4). The best sampling location is the one which maximizes $|a(t)|-|a(t-T)|$.

During the training period, the modified DFE algorithm of the present invention works the same as well known prior art DFE algorithms except that the future baud is taken into consideration. All of the bauds being transmitted are known during the training period and there is no difficulty in obtaining the future baud. After the training period, some modifications in the DFE are required, as discussed below.

Figure 9:
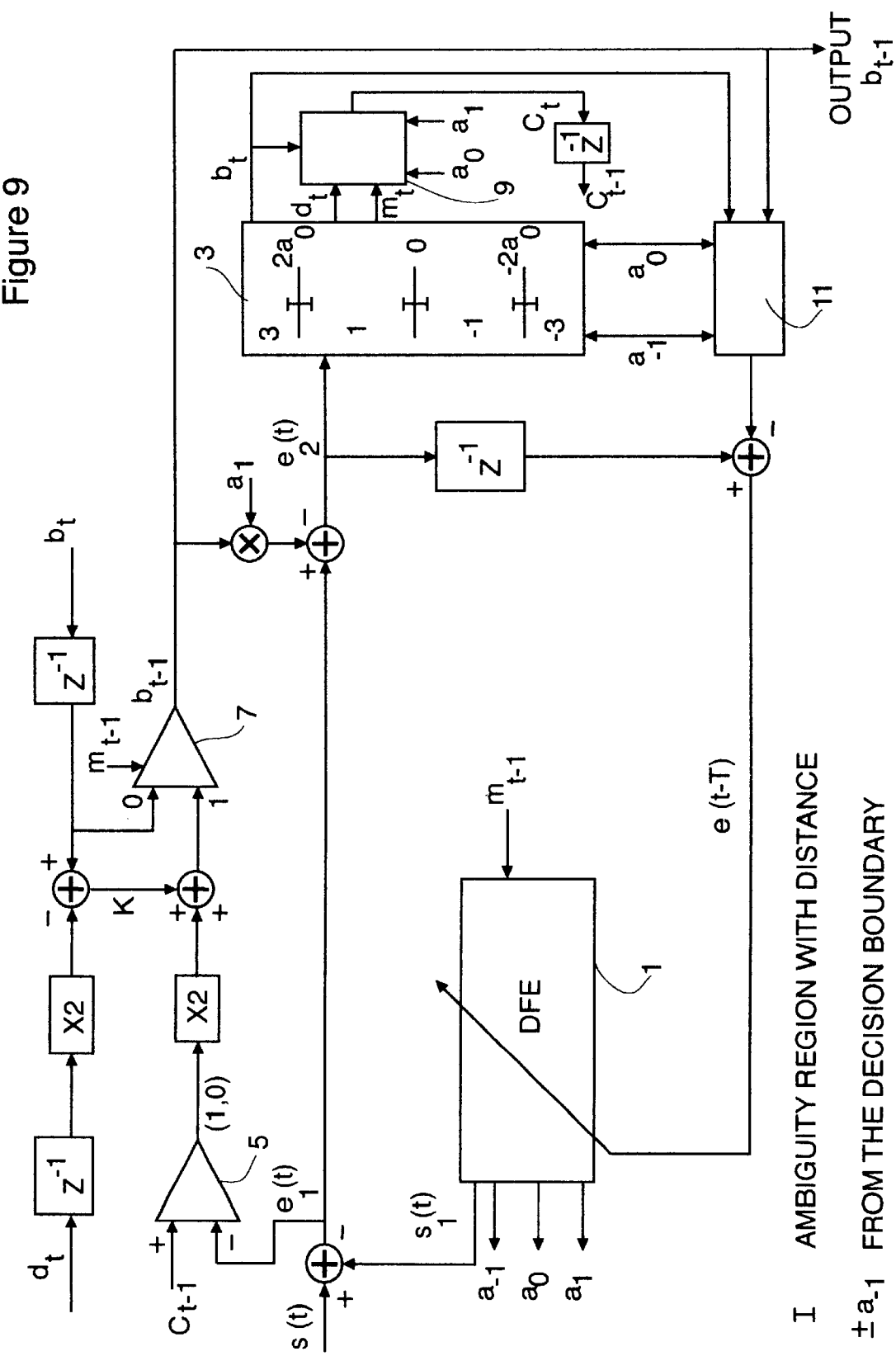
FIG. 9 is a block diagram of a circuit implementation of the second embodiment.

FIG. 9 shows the implementation diagram for the modified DFE algorithm according to the second embodiment. The implementation of the first embodiment is identical except that several parameter calculations are modified, as would be understood by a person of ordinary skill in the art having read the foregoing description of the first embodiment. In order to better illustrate the time movement of the signal, a slightly different notation is utilized from that used in prior portions of this specification. All parameters are represented with subscript t or t−l, which represent that parameter at time t or t−T, (e.g., b$_{t-1}$, b$_t$ and b$_{t+i}$ represent the data at time t−T, t and t+T).

In FIG. 9, the input signal is s(t) and the DFE coefficients are adapted with error signal e(t):

$$e(t) = s(t) - \sum_{k=-1}^{N} a_k b_{t-k} \quad (5)$$

However, the DFE block 1 output s$_1$(t) contains only part of the ISI estimation (i.e.

$$S_1(t) = \sum_{k=2}^{N} a_k b_{t-k}$$

The coefficients a$_1$,a$_0$,a$_{-1}$ are output from DFE block |and their contributions to the ISI are calculated in a subsequent stage, as discussed below. Main decision block 3 generates the current baud estimation (four levels of b$_t$) according to a given detection boundary, where m$_t$ is an indicator for the ambiguity. If m$_t$=0, there is no ambiguity and if m$_t$=1, ambiguity exists for the current output data b$_t$. When ambiguity exists d$_t$ is either 0 or 1, depending on the signal location as shown in FIG. 8.

A comparator circuit 5 generates a "1" output if the threshold C$_{t-1}$ is larger than e$_1$(t). Otherwise, the output of comparator 5 is 0. The function of comparator 5 is to determine whether b$_{t-1}$ is K or K+2 when ambiguity occurs at t=t$_0$, where K=b$_{t-1}$−2d$_{t-1}$ is the smaller the two possible values of b$_{t-1}$ at the two sides of the ambiguity region (see FIGS. 2–8). A multiplexer 7 outputs data from the upper input port (port 0) if m$_{t-1}$=0, (i.e. no ambiguity occurs in the previous baud decision), which is equivalent to the direct pass of b$_{t-1}$. Otherwise, ambiguity occurs in the previous baud decision and the output of multiplexer 7 is the lower input port (port 1), Under such circumstance, the output is the new calculated b$_{t-1}$. The value b$_{t-1}$ is multiplied by coefficient a$_1$ and the product of this multiplication represents the most recent post-cursor ISI term which is then subtracted from the error signal e$_1$(t) to yield a further error signal e$_2$(t), which is the input to the main decision block 3. Block 9 calculates the value of C$_t$ when m$_t$=1:

$$C_t = (b_t - 2d_t + 1)a_1 + (2d_t - 1)a_0 \quad (6)$$

Block 11 calculates the ISI contribution from a$_0$a$_{-1}$. Its output is $$a_0 b_{t-1} + a_{-1} b_t$$

In Equation (5) the error calculation requires the future baud b$_{t+1}$. There is no difficulty in providing the future baud b,+, during the training period when all the bauds are known. However, during normal data transmission, the future baud is unknown. Therefore, the adaptation is delayed for one baud resulting in:

$$e(t-T) = s(t-T) - \sum_{k=-1}^{N} a_k b_{t-k-1}$$

The sign adaptation algorithm is modified as $$a_k = a_k + \mu e(t-T) sgn(b_{t-k-1})$$

where $\mu$ is an adaptive constant.

The adaptation, and blocks 5, 7 and 9, are all controlled by the ambiguity indicator $m_t$. When ambiguity occurs, the adaptation stops and blocks 5 to 9 start to operate. Finally, due to the ambiguity in the current baud detection, the data output is delayed by one baud, (i.e., the output is $b_{t-1}$ instead of $b_t$).

In the DFE adaptation set forth above, the data $b_t$ is used which may or may not have ambiguity (i.e. its value may not always be correct). Any error in $b_t$ will cause further error in $e(t-T)$ and hence the adaptation. To ensure an accurate adaptation, it may be advantageous to delay the adaptation by another baud period, in which case $e(t-2T)$ is used so that Equation (7) becomes $$a_k = a_k + \mu e(t-2T) sgn(b_{t-k-2}) \tag{8}$$

Simulations have shown that a slight SNR improvement is achieved by delaying the adaptation by one further baud period as set forth herein.

To further avoid the possibility of false coefficient adaptation during normal data receiving, a threshold of $|a_0|-|a_{-1}|$, (i.e. the same as the decision distance) may be set such that the adaptation is made only when $|e(t-2T)|$ is smaller than that threshold. In this way, the adaptation is automatically stopped when a decision error is detected.

Other embodiments of the invention are possible without departing from the sphere and scope as set forth in the claims appended hereto.

We claim:

1. A decision feedback equalizer for determining a data value in a received signal sample $s(t)$ in the presence of intersymbol interference (ISI) comprising:

a DFE block for generating a signal $s_1(t)$ which is an estimate of all except a most recent post-cursor ISI term and for generating coefficients $a_{-1}$, $a_0$ and $a_1$;

a first subtractor for subtracting said signal $s_1(t)$ from said received signal sample $s(t)$ and in response generating an error sample $e_1(t)$;

a second subtractor for subtracting said most recent post-cursor ISI term from said error sample $e_1(t)$ and in response generating a further error sample $e_2(t)$;

a main decision block for receiving said further error sample $e_2(t)$ and in response generating a current data value estimation and an ambiguity indicator $m_t$ in said current data value; and a secondary decision block for receiving said error sample $e_1(t)$, receiving and delaying said current data value estimation and ambiguity indicator $m_t$ thereby resulting in a previous data value estimation and previous ambiguity indicator $m_{t-1}$, respectively, and in response generating an adaptive decision threshold ($C_{t-1}$) based on said previous data value estimation and (i) in the event said previous ambiguity indicator $m_{t-1}$ indicates no ambiguity then outputting said previous data value estimation and (ii) in the event said previous ambiguity indicator $m_{t-1}$ indicates ambiguity then modifying said previous data value estimation based on a comparison between said error sample $e_1(t)$ and said adaptive decision threshold $C_{t-1}$; and an ISI calculation block for receiving said current data value estimation, said previous data value estimation, said coefficients $a_{-1}$ and $a_0$, and a delayed version of said further error sample $e_2(t)$, and in response generating a final error signal $e(t-T)$ in which signal contributions from said current data value estimation, said post-cursor ISI and a most recent precursor ISI term have been subtracted, for adapting said coefficients.

2. The decision feedback equalizer of claim 1, wherein said secondary decision block further comprises:

a comparator for comparing said error sample $e_1(t)$ to said adaptive decision threshold $C_{t-1}$ when said previous ambiguity indicator $m_{t-1}=1$, thereby indicating that said sample $s(t)$ is within an ambiguity region between data values, and in the event $C_{t-1} > e_1(t)$ then generating an output of value equal to 1 and otherwise generating an output of value equal to 0;

a first multiplier for doubling said output of said comparator;

a first delay for receiving and delaying a location indicator value $d_t$ by one sample period, said indicator value being one of either 0 or 1 depending on location of said sample $s(t)$ within said ambiguity region;

a second multiplier for doubling said location indicator value delayed via said first delay;

a second delay for receiving and delaying a prior data value $b_t$ by one sample period resulting in a signal $b_{t-1}$;

a second subtractor for subtracting said location indicator value doubled via said second multiplier from said prior data value delayed via said second delay, and in response outputting a further variable denoted as K, wherein $K = b_{t-1} - 2d_{t-1}$;

a summer for adding said further variable K and said output of said first multiplier and generating an output sum signal of value K in the event the output value of said comparator is 0 and of value K+2 in the event the output value of said comparator is 1;

a gate circuit having a control input for receiving said prior ambiguity indicator $m_{t-1}$ a first data input for receiving said prior data value $b_t$ delayed by one sample period and a second data input for receiving said output sum signal, and in the event $m_{t-1}=0$ indicating no ambiguity in a prior bit decision then directly outputting said signal $b_{t-1}$, and in the event $m_{t-1}=1$ indicating ambiguity in said prior bit decision then directly outputting said sum signal;

a further multiplier for multiplying the output of said gate circuit by $a_1$ received from said DFE block and in response generating said most recent post-cursor ISI term for application to said first subtractor.

3. A method for detecting a current data bit $b_0$ in a received sample $$s_k(n) = a_0 b_0 + \sum_{k \neq 0} a_k b_k + v(n),$$

where $a_k$ represents a sample of total channel response, $v(n)$ represents noise which is uncorrelated with data, and $a_0$ represents signal power of said current data bit, comprising the steps of:

extending an initial decision boundary of 0 to $-a_{-1}$ for detecting $b_0=1$ and to $a_{-1}$ for detecting $b_0=-1$, resulting in a decision ambiguity region between $-a_{-1}$ and $a_{-1}$;

if at time $t=t_0$, $|s_0(n)| > a_{-1}$ then selecting $b_0$ without ambiguity to be one of either ±1 where $|v(n)| < a_0 - 2a_{-1}$; and if at time $t=t_0$, $|s0(n)| < a_{-1}$ such that said received signal sample falls within said decision ambiguity region, then (i) retaining a first possible solution as $b_0=-1, b_{-1}=3$, and a second possible solution as $b_0=1, b_{-1}=3$, and (ii) at time $t=t_1$ if $s_1(n) < 0$ then setting $b_1=1$ which is equivalent to $b_0=1$ at time $t=t_0$ and retrieving $b_{-1}=-3$ retained at time t=$t_0$ and in response setting $b_0$=−3, and if $s_1(n)$>0 then setting $b_1$=−1 which is equivalent to $b_0$=−1 at time t=$t_0$ and retrieving $b_{-1}$=3 retained at time t=$t_0$ and in response setting $b_0$=3.

4. A method for detecting a current data bit $b_0$ in a received sample $$s_k(n) = a_0 b_0 + \sum_{k \neq 0} a_k b_k + v(n),$$

where $a_k$ represents a sample of total channel response, $v(n)$ represents noise which is uncorrelated with data, and $a_0$ represents signal power of said current data bit, comprising the steps of:

extending a central decision boundary of 0 to −$a_{-1}$ for detecting $b_0$=1 and to $a_{-1}$ for detecting $b_0$=−1, resulting in a central decision ambiguity region between −$a_{-1}$ and $a_{-1}$;

extending a first adjacent decision boundary of −2$a_0$ to −2$a_0$−$a_{-1}$ for detecting $b_0$=−1 and to −2$a_0$+$a_{-1}$ for detecting $b_0$=−3, resulting in a first adjacent decision ambiguity region between −2$a_0$−$a_{-1}$ to −2$a_0$+$a_{-1}$;

extending a second adjacent decision boundary of 2$a_0$ to 2$a_0$+$a_{-1}$ for detecting $b_0$=1 and to 2$a_0$−$a_{-1}$ for detecting $b_0$=3, resulting in a second adjacent decision ambiguity region between 2$a_0$−$a_{-1}$ to 2$a_0$+$a_{-1}$;

if at time t=$t_0$, said signal sample is detected as falling outside each of said decision ambiguity regions then selecting $b_0$ without ambiguity to be one of either ±1 or ±3 where $|v(n)|<a_0-2a_{-1}$; and if at time t=$t_0$, said signal sample is detected as falling inside one of said decision ambiguity regions between $b_0$=i and $b_0$=i+2, where i=one of either −3, −1 or 1, then (i) retaining a first possible solution as $b_0$=i, $b_{-1}$=3, and a second possible solution as $b_0$=i+2, $b_{-1}$=−3, and (ii) at time t=$t_1$ if $s_1(n)$<(i+1)$a_1$ then setting $b_1$=i+2 which is equivalent to $b_0$=i+2 at time t=$t_0$ and retrieving $b_{-1}$=−3 retained at time t=$t_0$ and in response setting $b_0$=−3, and if $s_1(n)$>(i+1)$a_1$ then setting $b_1$=i which is equivalent to $b_0$=i at time t=$t_0$ and retrieving $b_{-1}$=3 retained at time t=$t_0$ and in response setting $b_0$=3.

5. A method for detecting a current data bit $b_0$ in a received sample $$s_k(n) = a_0 b_0 + \sum_{k \neq 0} a_k b_k + v(n),$$

where $a_k$ represents a sample of total channel response, $v(n)$ represents noise which is uncorrelated with data, and $a_0$ represents signal power of said current data bit, comprising the steps of:

extending an initial decision boundary of 0 to −2$a_{-1}$ for detecting $b_0$=1 and to 2$a_{-1}$ for detecting $b_0$=−1, resulting in a decision ambiguity region between −2$a_{-1}$ and 2$a_{-1}$;

if at time t=$t_0$, $|s_0(n)|>2a_{-1}$ then selecting $b_0$ without ambiguity to be one of either ±1 where $|v(n)|<a_0-a_{-1}$; and if at time t=$t_0$, $|s_0(n)|<2a_{-1}$ such that said received signal sample falls within said decision ambiguity region, then (i) if $0 \leq s_0(n) \leq 2a_{-1}$ retaining a first three pairs of possible solutions as {$b_0$=−1, $b_{-1}$=3}, {$b_0$=1, $b_{-1}$=−3}, and {$b_0$=1, $b_{-1}$=−1}, and (ii) at time t=$t_1$ if $s_1(n)<|a_0|$ then setting $b_1$=−1 which is equivalent to $b_0$=1 at time t=$t_0$, and if $s_1(n)>|a_0|$ then setting $b_1$=−1 which is equivalent to $b_0$=−1 at time t=$t_0$, and (i') if $-2a_{-1} \leq s_0(n)<0$ retaining a second three pairs of possible solutions as {$b_0$=−1, $b_{-1}$=1}, {$b_0$=1, $b_{-1}$=−3}, and {$b_0$=−1, $b_{-1}$=3}, and (ii') at time t=$t_1$ if $s_1(n)<|a_0|$ then setting $b_1$=1 which is equivalent to $b_0$=1 at time t=$t_0$, and if $s_1(n)>|a_0|$ then setting $b_1$=−1 which is equivalent to $b_0$=−1 at time t=$t_0$.

6. A method for detecting a current data bit $b_0$ in a received sample $$s_k(n) = a_0 b_0 + \sum_{k \neq 0} a_k b_k + v(n),$$

where $a_k$ represents a sample of total channel response, $v(n)$ represents noise which is uncorrelated with data, and $a_0$ represents signal power of said current data bit, comprising the steps of:

extending a central decision boundary of 0 to −2$a_{-1}$ for detecting $b_0$=1 and to 2$a_{-1}$ for detecting $b_0$=−1, resulting in a central decision ambiguity region between −2$a_{-1}$ and 2$a_{-1}$;

extending a first adjacent decision boundary of −2$a_0$ to −2$a_0$ −2$a_{-1}$ for detecting $b_0$=−1 and to −2$a_0$+2$a_{-1}$ for detecting $b_0$=−3, resulting in a first adjacent decision ambiguity region between −2$a_0$−2$a_{-1}$ to −2$a_0$+2$a_{-1}$;

extending a second adjacent decision boundary of 2$a_0$ to 2$a_0$+2$a_{-1}$ for detecting $b_0$=1 and to 2$a_0$−2$a_{-1}$ for detecting $b_0$=3, resulting in a second adjacent decision ambiguity region between 2$a_0$−2$a_{-1}$ to 2$a_0$+2$a_{-1}$;

if at time t=$t_0$, said signal sample is detected as falling outside each of said decision ambiguity regions then selecting $b_0$ without ambiguity to be one of either ±1 or ±3 where $|v(n)|<a_0-a_{-1}$; and if at time t=$t_0$, said signal sample is detected as falling inside one of said decision ambiguity regions between $b_0$=i and $b_0$=i+2 with a location indicator value $d_r$ being one of either 0 or 1, where i=one of either −3, −1 or 1, then (i) retaining first possible solution pairs for $d_r$=0 as {$b_0$=i, $b_{-1}$=1}, {$b_0$=i, $b_{-1}$=3}, {$b_0$=i+2, $b_{-1}$=−3}; and second possible solution pairs for $d_r$=1 as {$b_0$=i, $b_{-1}$=3}, {$b_0$=i+2, $b_{-1}$=−3} and {$b_0$=i+2, $b_{-1}$=−1}; and (ii) at time t=$t_1$ if $s_1(n)$<(i+1)$a_1$+(2d−1)$a_0$ then setting $b_1$=i+2 which is equivalent to $b_0$=i+2 at time t=$t_0$, and if $s_1(n)$>(i+1)$a_1$+(2d−1)$a_0$ then setting $b_1$=i which is equivalent to $b_0$=i at time t=$t_0$.

\* \* \* \* \*